United States Patent [19]

Tsuboi et al.

[11] Patent Number: 5,623,142
[45] Date of Patent: Apr. 22, 1997

[54] OPTICAL ENCODING DETECTING COARSE AND FINE POSITION

[75] Inventors: Takayuki Tsuboi; Hiroyuki Hase, both of Yokohama, Japan

[73] Assignee: Canon Kabushiki Kaisha, Tokyo, Japan

[21] Appl. No.: 453,471

[22] Filed: May 30, 1995

Related U.S. Application Data

[63] Continuation of Ser. No. 128,751, Sep. 30, 1993, abandoned, which is a continuation of Ser. No. 990,931, Dec. 14, 1992, abandoned, which is a continuation of Ser. No. 833,707, Feb. 11, 1992, abandoned.

[30] Foreign Application Priority Data

Feb. 13, 1991 [JP] Japan .................................. 3-020143
Feb. 13, 1991 [JP] Japan .................................. 3-020144

[51] Int. Cl.⁶ .................................................. G01D 5/34
[52] U.S. Cl. .............................. 250/231.18; 250/237 G; 341/13; 356/395
[58] Field of Search ........................ 250/231.13, 231.14, 250/231.18, 237 G; 356/395; 341/13, 31

[56] References Cited

U.S. PATENT DOCUMENTS

| | | | |
|---|---|---|---|
| 4,633,224 | 12/1986 | Gipp et al. | 250/231.13 |
| 4,720,699 | 1/1988 | Smith | 250/237 G |
| 4,750,821 | 6/1988 | Yamamoto et al. | 250/231.14 |
| 4,945,231 | 7/1990 | Ohya et al. | 250/237 G |
| 5,003,171 | 3/1991 | Paley | 250/231.18 |

Primary Examiner—Stephone Allen
Attorney, Agent, or Firm—Fitzpatrick, Cella, Harper & Scinto

[57] ABSTRACT

An optical type encoder is comprised of a gauge member and a sensor portion moved relative to each other with the movement of an object to be detected. The gauge member has a plurality of slit rows comprising a plurality of slits formed at intervals along the direction of movement of the object to be detected, and a plurality of slit intervals formed by the corresponding slits in the slit rows are made partly equal. The sensor portion has at locations corresponding to the slit rows position detecting type light receiving means for receiving light beams from light projecting means passed through the plurality of slits rows of the gauge member, and the position information of the object to be detected is detected by the utilization of signals from these light receiving means.

21 Claims, 10 Drawing Sheets

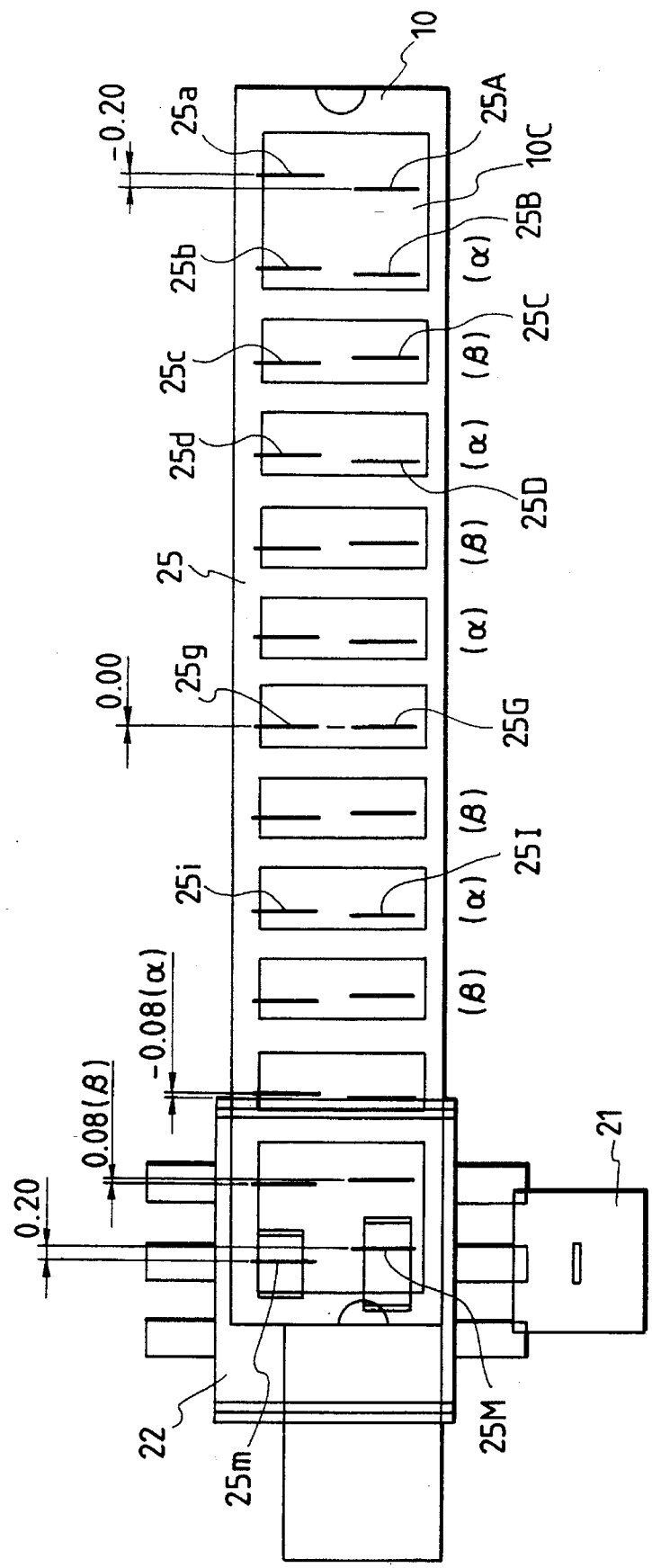

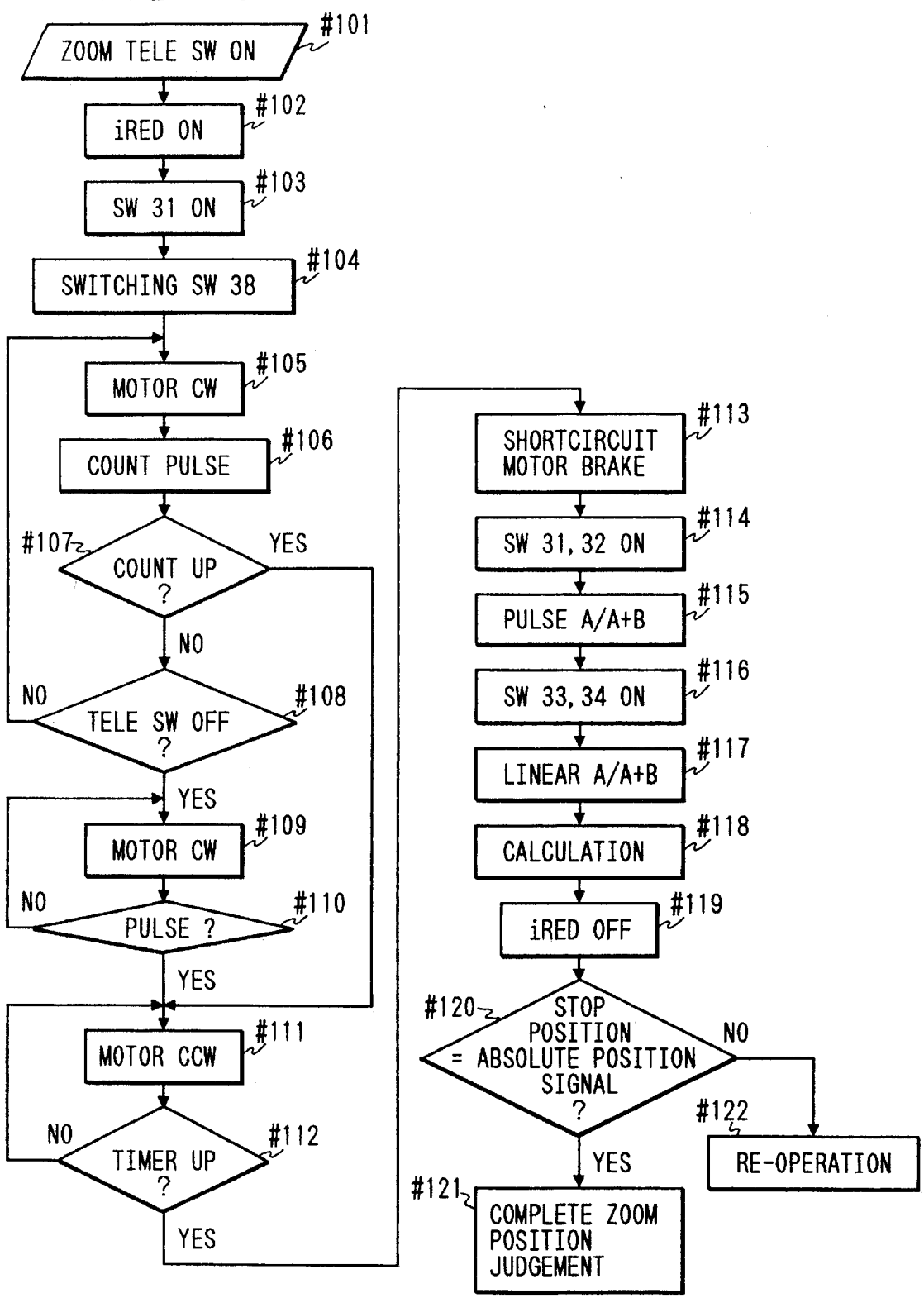

1

OPTICAL ENCODING DETECTING COARSE AND FINE POSITION

This application is a continuation of application Ser. No. 08/128,751 filed Sep. 30, 1993, which was a continuation of Ser. No. 07/990,931 filed Dec. 14, 1992, which was a continuation of Ser. No. 07/833,707, filed Feb. 11, 1992, all now abandoned.

BACKGROUND OF THE INVENTION

1. Field of the Invention

This invention relates to an optical type encoder, and particularly to an optical type encoder used, for example, in a lens barrel or the like having a magnification changing system for moving a lens in the direction of the optical axis thereof to thereby vary the focal length thereof and suitable for detecting, for example, the position of the lens relative to another lens or a camera body.

2. Related Background Art

Heretofore, in a lens barrel having a magnification changing system for moving a lens in the direction of the optical axis thereof to thereby vary the focal length thereof, as a method of controlling the amount of movement of the lens and the position of the lens relative to a camera body there has been, for example, a method comprising causing a cam ring formed with a cam slot and a guide pin mounted on a lens frame to cooperate with each other to rotate the cam ring, thereby driving a lens unit and controlling the relative position and the amount of movement of the lens unit.

Also, as an optical type encoder for detecting the position of such a lens, there has been proposed by the applicant one which is comprised of a slit plate provided with a plurality of slits and a photocoupler comprising light projecting and receiving elements for projecting light onto the slits and receiving slit light passed through the slits. The encoder is designed to be capable of detecting the relative movement of the slit plate and the photocoupler resulting from the movement of the lens to thereby detect the position of the lens.

In the optical type encoder described above, if the number of positions of the slits is increased, the difference between one slit and another slit, i.e., the manufacturing error between the slits in respective positions, becomes severe. This means that severity is required not only of the error between the slits, but also of the accuracy of the inclination of a guide portion guiding the lens and the accuracy of inclination of a sensor.

SUMMARY OF THE INVENTION

It is an object of the present invention to provide an encoder in which the manufacturing accuracy can be made rough and the detection accuracy can be made precise.

It is another object of the present invention to provide an encoder which can be manufactured inexpensively as previously described and which can be applied to various apparatuses requiring position detection.

Other objects of the present invention will become apparent from the following detailed description of the invention.

To achieve the above objects, in one aspect of the present invention, the encoder is comprised of a gauge member and a sensor portion moved relative to each other with the movement of an object to be detected, said gauge member has a plurality of slit rows comprising a plurality of slits formed at intervals along the direction of movement of said object to be detected, and a plurality of slit intervals formed by the corresponding slits in said slit rows are made partly equal. The sensor portion has, at locations corresponding to said slit rows, position detecting type light receiving means for receiving light beams from light projecting means passed through the plurality of slit rows of said gauge member, and the position information of the object to be detected is detected by the utilization of signals from these light receiving means.

BRIEF DESCRIPTION OF THE DRAWINGS

FIG. 7 is a plan view of the optical type encoder shown in FIG. 6.

FIG. 10 is a flow chart showing the operation by the circuit shown in FIG. 5.

DETAILED DESCRIPTION OF THE PREFERRED EMBODIMENTS

Figure 1:
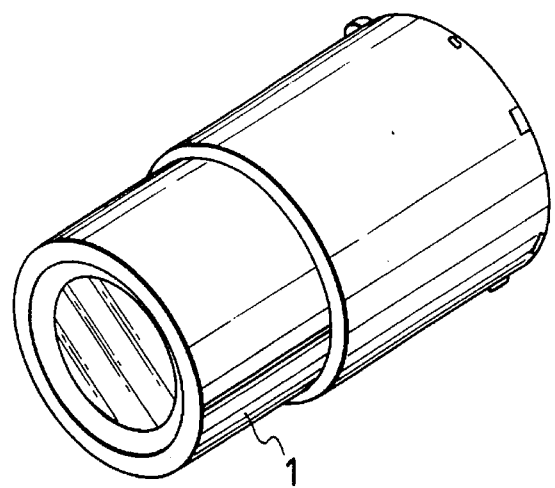
FIG. 1 is a pictorial perspective view of a lens barrel in which the present invention can be effectively carried out.
Figure 3:
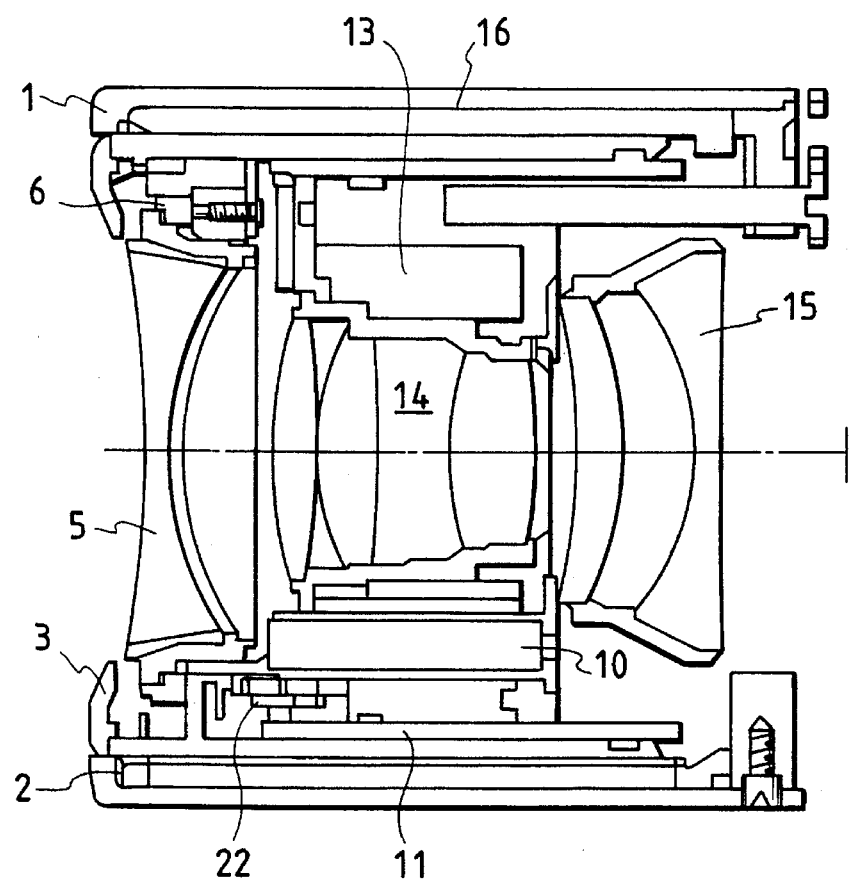
FIG. 3 is a cross-sectional view of the lens barrel of FIG. 1.
Figure 2:
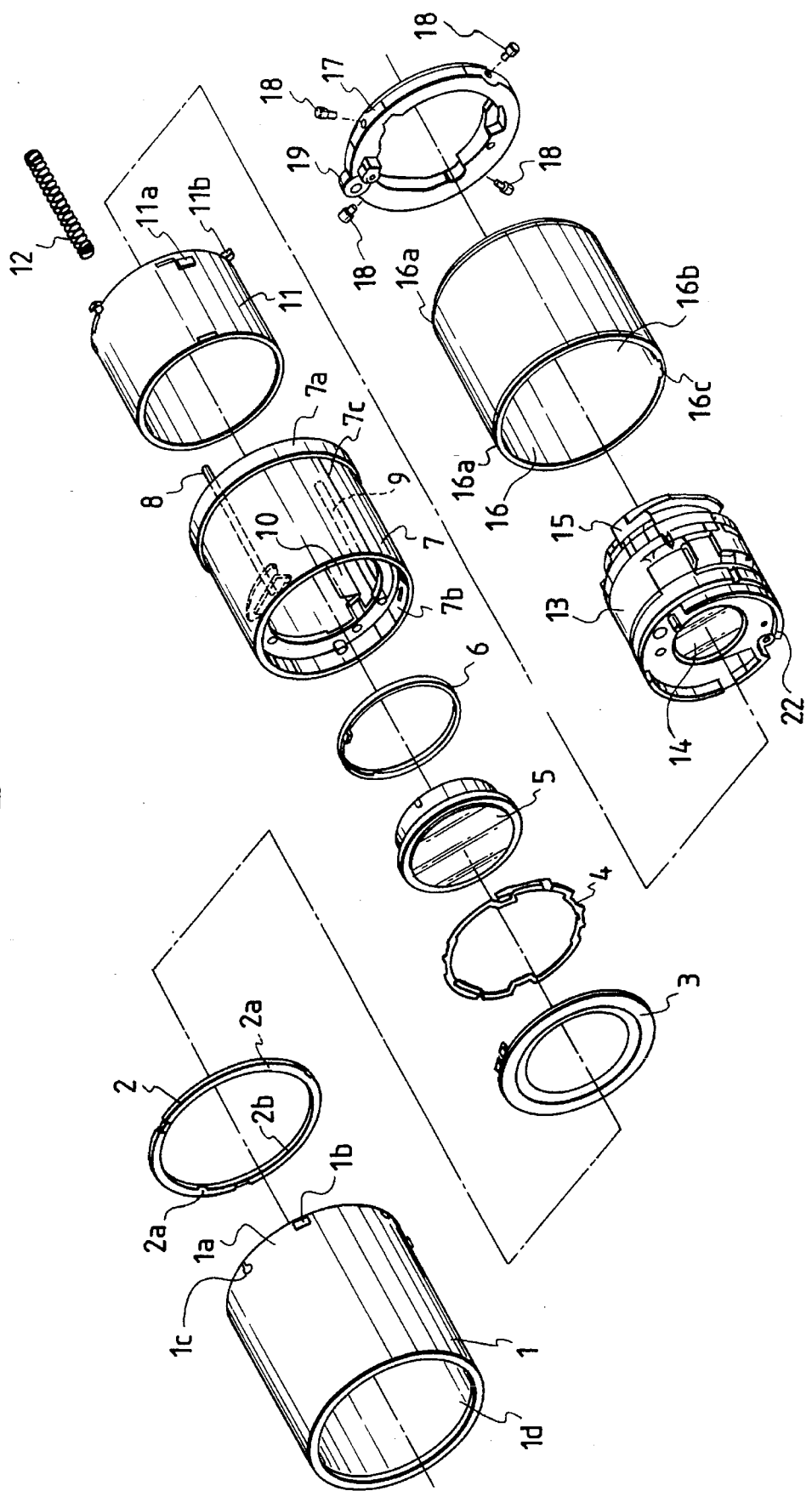
FIG. 2 is an exploded perspective view of the lens barrel of FIG. 1.
Figure 4:
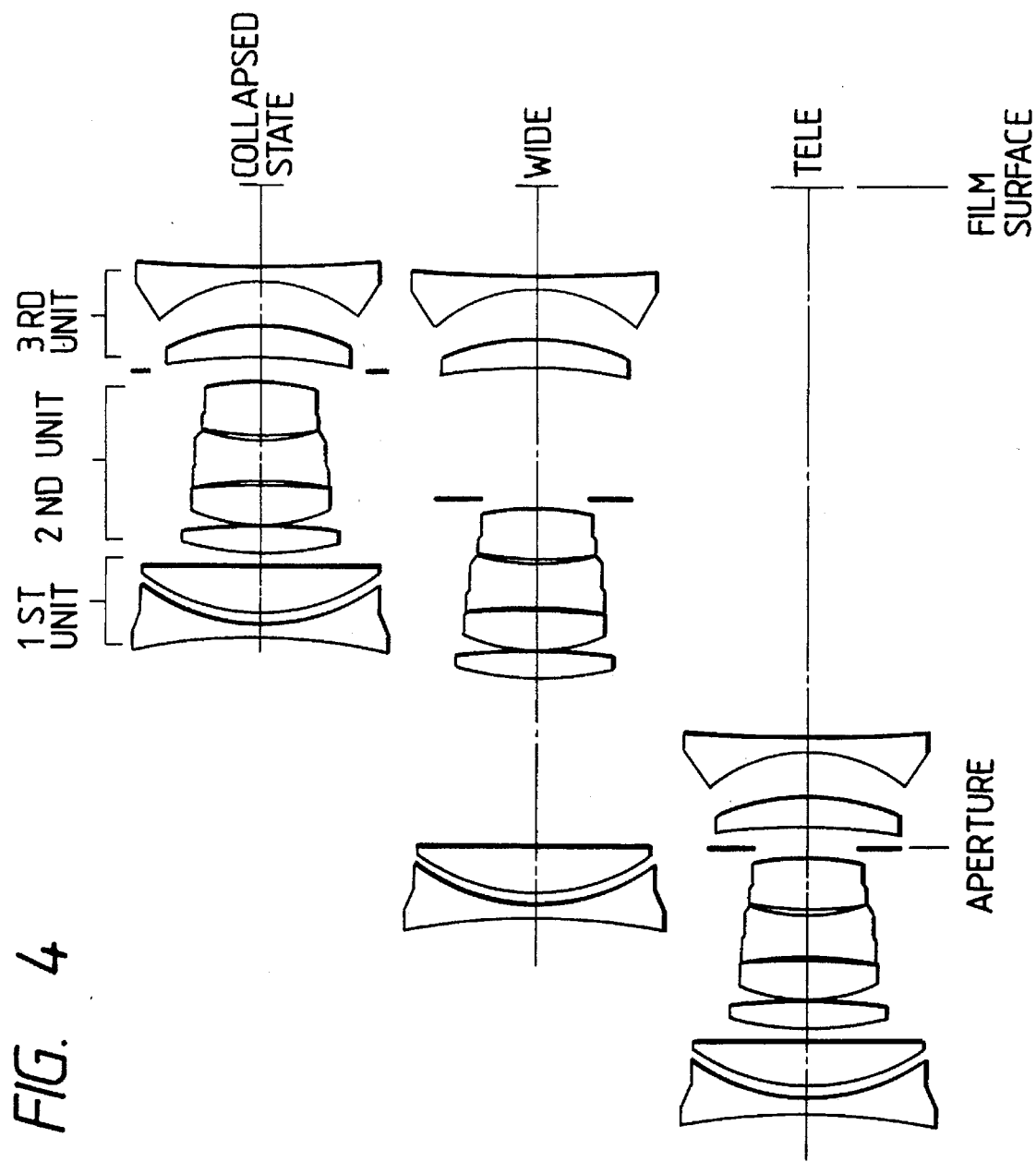
FIG. 4 shows the lens positions in the collapsed state, WIDE state and TELE state, respectively, of the lens barrel shown in FIG. 1.

FIGS. 1 to 3 show a lens barrel in which the present invention can be effectively carried out. The lens barrel shown in FIGS. 1 to 3 is a zoom lens comprising three unit lenses and is of the so-called collapsible mount type which, in a non-photographing state, is made compact and contained in a camera body, and during photographing, is axially moved forwardly of the camera. The first unit lens, the second unit lens and the third unit lens assume lens positions as shown in FIG. 4 in the collapsed state, WIDE state and TELE state.

FIG. 1 is a pictorial perspective view of the lens barrel unit in which an optical type encoder according to the present invention is contained, FIG. 2 illustrates the mechanism of the lens barrel unit, and FIG. 3 is a cross-sectional view of the unit in its collapsed state. The reference numeral 1 designates a rectilinear movement guide having the functions of sheathing the lens barrel unit. The rectilinear movement guide 1 is fixed to a half-moon plate unit 17, which will be described later, by screws 18 and is designed to be collapsed in a camera body by a collapsing mechanism, not shown.

The rectilinear movement guide 1 has a pawl portion 1b for being locked in the aforementioned collapsed state by a locking mechanism, not shown. The reference numeral 2 denotes a sand-proof ring unit serving to seal the space between the rectilinear movement guide 1 and a barrel 7 movable in the direction of the optical axis, and having two key portions 2a adapted to fit into a groove 7c in the barrel 7 to rectilinearly move the barrel 7.

The reference numeral 3 designates a decorative plate, and the reference numeral 4 denotes a first unit holding-down spring, for holding down a first unit lens 5, and a focusing ring 6 within the barrel 7. When the focusing ring 6 is extraneously rotated in its held-down state shown, the first unit lens 5 is moved back and forth in the direction of the optical axis relative to the barrel 7, whereby the position of the lens can be adjusted. The barrel 7 has a male helicoid 7a meshing with the helicoid thread portion 16b of a female helicoid cylinder 16, which will be described later. The aforementioned first unit lens is contained in the fitting portion 7b of the barrel 7, and a second unit guide bar 8, a second unit clamper bar 9 and a prism unit, which is the gauge member of the optical type encoder and which will be described later, are integrally disposed in the barrel 7.

The reference numeral 11 designates a second unit cam ring rotatably supported in the bore of the barrel 7 and having a latch pawl 11a and a pin 11b rotatable only in the direction of rotation with the female helicoid 16, which will be described later. The second unit cam ring 11 controls the spacing between the first lens unit and the second unit lens by a differential type cam, not shown, corresponding to the rotation of the female helicoid. The reference numeral 12 denotes a second unit put-aside spring, which urges the second lens unit rearwardly relative to the first lens unit to stabilize the cam stroke at the same time, the spacing between the first and second unit lenses, as shown in FIG. 3, is reduced by the stopper member of the camera body, not shown, during the collapsing operation, which will be described later. The second unit put aside spring 12 also and serves to push the second unit lens 13 rearwardly when the barrel is again moved axially outward.

The second lens unit 13 contains therein a shutter and a focusing unit, not shown, and a second unit lens 14 is integrally coupled thereto. Further, a third lens unit is supported on the second lens unit for axial outward movement rearwardly of the camera by a focusing mechanism. The third lens unit is designed to be moved axially, both inwardly and outwardly during zooming and focusing.

The female helicoid cylinder 16 has its outer peripheral portion 16a rotatably fitted to the bore portion 1d of the rectilinear movement guide 1 as previously described, and the female helicoid portion 16b of the bore is in a meshing engagement with the male helicoid thread 7a of the barrel 7. Further, the groove 16c of the female helicoid cylinder 16 fits to the pin 11b of the second unit cam ring 11.

The half-moon plate 17 is secured to the rectilinear movement guide 1 by the screws 18 as previously described, and a zoom gear 19 is rotatably supported on one end thereof. The zoom gear 19 receives a drive force from a motor 43, shown in FIG. 5, and transmits it to the inner gear, not shown, of the female helicoid 16, and governs the zooming operation of the present embodiment.

Figure 6:
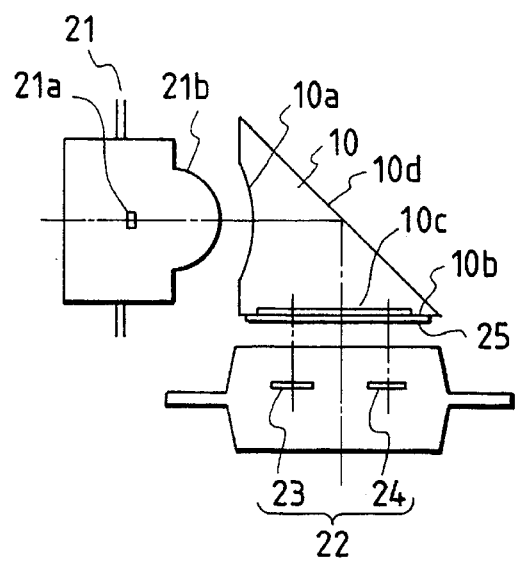
FIG. 6 is a cross-sectional view showing an embodiment of the optical type encoder according to the present invention.

The linear sensor 22 of the optical type encoder shown in FIGS. 3 and 6 is integrally secured below the second lens unit 13.

The construction of the zoom lens barrel is as described above, and an embodiment of the optical type encoder according to the present invention will now be described with reference to FIGS. 6 and 7.

FIG. 6 is a cross-sectional view of the optical type encoder shown in FIG. 3 as it is seen from the front face of the camera. The reference numeral 10 designates a prism forming a gauge member provided integrally with the first lens unit 5. The prism 10 is formed with a cylindrical lens portion 10a, a total reflection surface 10d, a transmitting surface 10c depressed in the shape of a well crib as shown in FIG. 7, and a securing surface 10b to which a mask 25, which is to be described is secured. In the mask 25 secured to the securing surface 10b of the prism 10, as shown in FIG. 7, there are formed in parallel a slit row comprising slits 25a–25m (hereinafter referred to as the pulse slit row) and a slit row comprising slits 25A–25M (hereinafter referred to as the linear slit row). The slits 25a–25m, constituting the pulse slit row are formed at substantially equal pitches, and the slits 25A–25M, constituting the linear slit row, in the present embodiment, are formed with five interval patterns relative to the corresponding pulse slits 25a–25m. These slits are formed, for example, by the photoengraving process so that light may pass through only the slits.

The above-mentioned five interval patterns are such that the interval is −0.2 mm like the interval formed by the pulse slit 25a and the linear slit 25A, the interval is +0.08 mm (indicated by $\alpha$ in FIG. 7) like the interval formed by the pulse slit 25b and the linear slit 25B (at five locations in all), the interval is 0 mm like the interval formed by the slit 25a and the slit 25A corresponding thereto, the interval is +0.08 mm (indicated by $\beta$ in FIG. 7) like the interval between the pulse slit 25c and the linear slit 25c (at five locations in all), and the interval is +0.2 mm like the interval between the pulse slit 25m and the linear slit 25 M.

Figure 8:
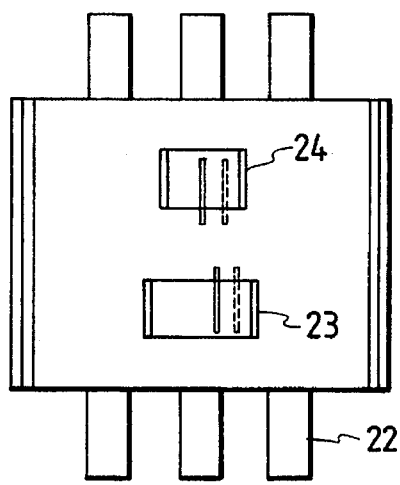
FIG. 8 is an enlarged plan view of the optical type encoder of FIG. 6.

The reference numeral 22 denotes a linear sensor movable with the second unit lens, and photoelectric conversion elements of the position detecting type differing in length (hereinafter referred to as the PSD's) 24 and 23 are provided at locations corresponding to the locations of the pulse slit row and the linear slit row. Also, the linear sensor 22 is integrally provided with an infrared light emitting element (iRED) 21, and infrared light from the chip 21a thereof is condensed by a dome lens 21b and enters the cylindrical lens portion 10a of the prism 10. The incident infrared light is totally reflected by the reflecting surface 10d and passes through the two rows of slits in the mask 25 to the PSD's 24 and 23 of the sensor 22. In FIG. 7, the sensor 22 shows the position at the TELE end or in the collapsed state, and as shown in FIG. 8, the intervals between the PSD's 24, 23 and the slits prevent the slit light, passed through each row of slits, from being received at two locations at a time.

The outputs of the PSD corresponding to the pulse slit row (hereinafter referred to as the pulse side PSD) 24 and the PSD corresponding to the linear slit row (hereinafter referred to as the linear side PSD) 23 are input to the circuit shown in FIG. 5 and the position detecting process is carried out.

Figure 5:
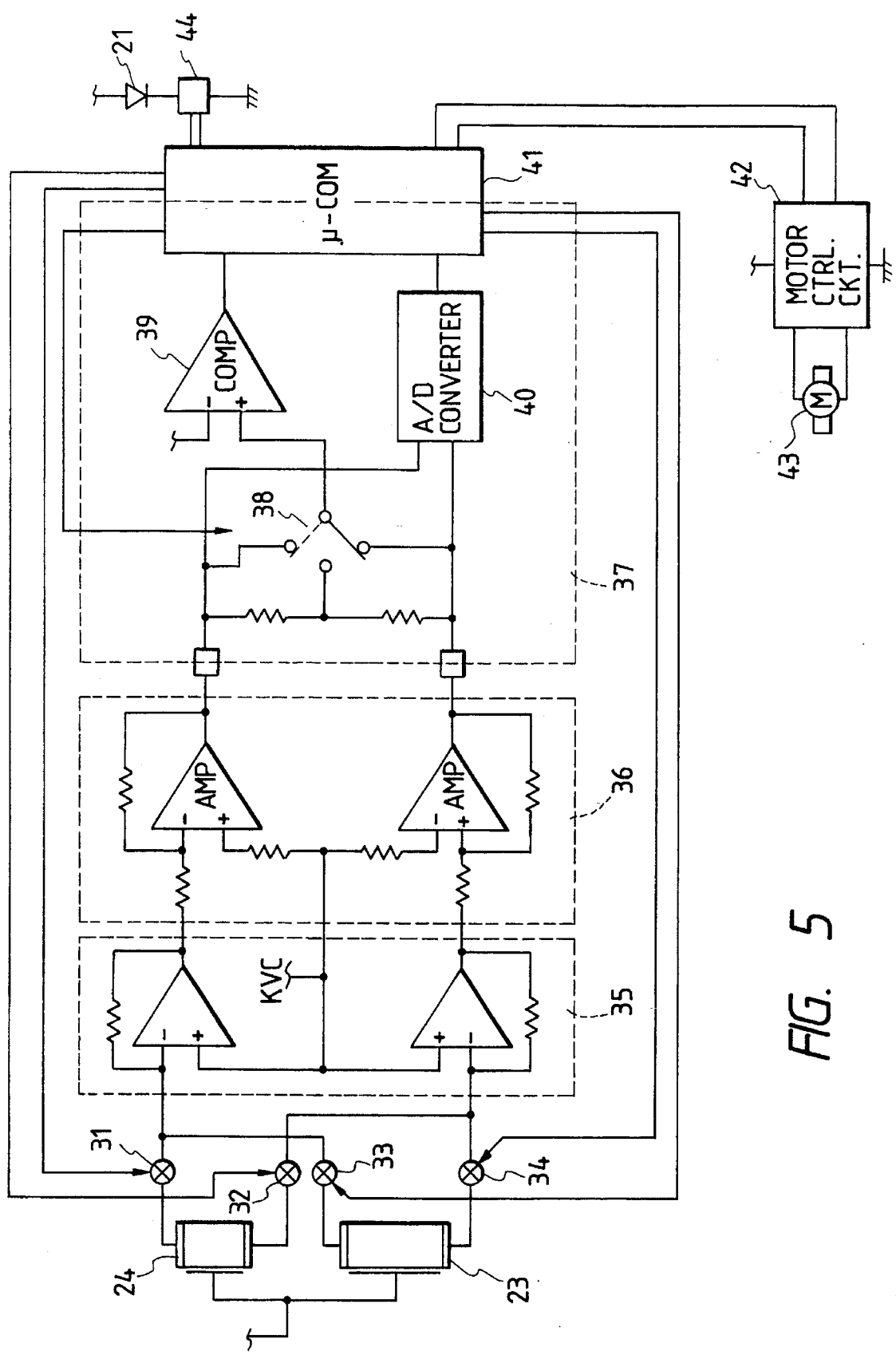
FIG. 5 is a circuit diagram showing an embodiment of the detection circuit of an optical type encoder according to the present invention.

In FIG. 5, the reference numerals 31–34 designate analog switches, the reference numeral 35 denotes a current/voltage converting circuit, the reference numeral 36 designates an amplifying circuit, and the reference numeral 37 denotes an IC block in which there are provided a switching circuit 38, a comparator 39 and an A/D converter 40. The reference numeral 41 designates a microcomputer, the reference numeral 42 denotes a conventional motor control circuit including a transistor bridge, the reference numeral 43 designates a zooming motor, and the reference numeral 44 denotes a selection circuit for switching the output value of the iRED 21.

Figure 9:
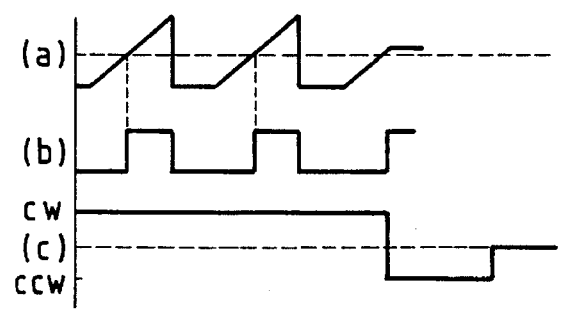
FIG. 9 shows the output waveforms of the PSD, etc. of the circuit shown in FIG. 5.

In the circuit shown in FIG. 5, the waveform of the PSD input to the + side terminal portion of the comparator 39 during driving is the waveform shown at (a) in FIG. 9, and the output waveform of the comparator 39 is the waveform shown at (b) in FIG. 9. The microcomputer 41 controls the motor control circuit 42 on the basis of the output of the comparator 39, and the motor control circuit 42 outputs a driving waveform as shown at (c) in FIG. 9.

The driving operation of the camera of the above-described construction will hereinafter be described.

In the camera of the present embodiment, the state in which during photographing, the lens barrel has been axially outwardly moved from the collapsed state shown in FIG. 4 to the WIDE state is the photographing waiting state and accordingly, the first zooming operation is the operation of changing the magnification from the short focal length side to the long focal length side.

When the photographer depresses the zoom TELESW, not shown, of the camera, the microcomputer 41 first turns on the iRED 21, and thereafter switches on an analog switch 31 and then changes over an analog switch 38 to the dotted line side and connects one output of the PSD 24 of the pulse slit row side to the input end of the comparator 39. Thereafter, it effects clockwise (CW) electrical energization to the motor 43 to thereby rotate the female helicoid 16 and axially move the first unit lens and the male helicoid 7a of the barrel 7 forward of the camera, and the second lens unit 13 is also moved with the lens unit 14 in accordance with the differential cam, not shown, of the second unit cam ring 11. At this time, the sensor 22 engaged with the lens unit 13 is also moved and receives the lights from the first slit row 25a–25m in succession and therefore, the output shown at (a) in FIG. 9 is put out from one output end of the PSD 24 and the output waveform as shown at (b) in FIG. 9 is put out from the comparator 39, and the microcomputer 41 in the present embodiment counts the pulse number thereof and detects how far the position from the last position, pre-input to the microcomputer 41 each lens unit has come. Thereafter, when the TELESW of the camera is released and when the zoom lens has come, for example, to between the slits 25h and 25i, the microcomputer 41 detects it, and reversely energizes the motor 43 when the first pulse, after the TELESW has been released, has risen, that is, when the light from the slit 25i has entered the PSD 24, and further short-circuits the motor 43 and stops it.

In the camera of the present embodiment, design is made such that the driving current of the iRED during the driving for the aforementioned zooming operation can be adjusted to change over the output value of the infrared ray by the selection circuit 44, whereby the stop position of the motor can be delicately (fine discrimination) adjusted. After the zoom driving is stopped, the analog switches SW31 and 32 of FIG. 5 are switched on at a time by the microcomputer 41, the outputs A and B at the opposite ends of the pulse side PSD 24 are calculated from an expression A/(A+B) by the output of the A/D converter 40, and then the analog switches 33 and 34 are switched on and the analog switches 31 and 32 are switched off. The outputs A and B of the linear side PSD 23 are likewise calculated from A/(A+B), and the difference between the two values is taken to thereby detect at what position the second unit lens is stopped (the detected value by this operation will hereinafter be referred to as the absolute value at that zoom position). At this time, as shown in FIG. 7, there are each five locations at which said difference is −0.08 mm (α) and +0.08 mm (β), respectively, but the absolute position of the zoom lens when stopped becomes known because the position of the zoom lens when the movement of this lens is started, i.e., the position at which the zoom lens was stopped after its last movement, is known, because the number of pulses generated after the movement of the zoom lens has been started is counted, and because the interval between the slits (in this case, the interval between the slits 25i and 25I) at the stop position of the zoom lens is known.

Now, the absolute value becomes necessary in the following two cases.

The first is a case where when the barrel is under the zooming operation, if an extremely strong extraneous force is applied, the female helicoid or the second unit cam ring is rotated by an amount corresponding to the back-lash of the gear to the motor and the lens interval is changed, and this will hereinafter be referred to as the first case.

The second is a case where the power supply battery of the camera has been drawn out when the barrel is under the zooming operation, and the power supply battery is again put into the camera. The absolute value of the zoom position is unknown, and where the zoom lens is cannot be known, and this will hereinafter this will be referred to as the second case.

In the above-described first case, the amount of deviation is slight because it is an amount corresponding to the back-lash of the gear. The difference in position between the slit in the pulse slit row, and the slit in the linear slit row which are adjacent to each other, differs between those slits adjacent to each other. The operation as previously described is executed and therefore, even in the first case, it becomes possible to know the absolute position of the stopped position.

In the above-described second case, the replacement of the power supply battery is rarely done and therefore, even if the absolute value immediately after the replacement of the power supply battery, i.e., the value of α or the value of β, is read, this system is one in which there are many same absolute values and thus, it is impossible to recognize a correct absolute value. So, this system is designed such that when the power supply battery is replaced, the zoom lens is brought to such a position that only one signal is put out. For example, the position of only one absolute value in which electrical energization for shifting the zoom lens to the TELE side is effected by the zooming motor 43, whereby the correct absolute value can be known.

The operation in the construction as described above will now be described in greater detail with reference to the flow chart of FIG. 10.

When the photographer depresses the zoom button on the TELE side of the camera (#101), the iRED 21 is first turned on (#102), and the analog switch 31 is switched on (#103) and the analog switch 38 is changed over to the upper terminal (see the dotted line) as viewed in FIG. 5 (#104). The motor 43 is then rotated in the clockwise direction (#105), and the female helicoid 16 is rotated through the intermediary of the zoom gear 19 to thereby move each lens unit to the TELE side. Thereupon, the positional relationship between the prism 10 and the sensor 22 becomes such that the sensor 22 is moved from right to left as viewed in FIG. 7, and the linear sensor 22 measures the interval between the first and second unit lenses. At this time, only the analog signal (abbreviated as the A signal) on one side of the pulse slit row side PSD 24, as shown in FIG. 9, is detected from the start position by the use of the comparator 39 as previously described, and a pulse number conforming to the number of slits in the pulse slit row is counted (#106).

The pulses generated by the movement of the zoom lens during zooming as described above are added and whether the number thereof has reached the MAX value, i.e., the TELE end, is discriminated (#107), and whether the photographer has released the zoom TELESW (not shown) is discriminated (#108).

When after such discriminating operations, the TELESW is released, for example, for the operation of the zoom lens, the motor 43 is further electrically energized toward the TELE side as previously described (#109), and when the signal of one side of the next PSD 24 on the pulse slit row side has reached a certain level (#110), that is, when the output of the comparator 39 has become "Hi", the motor 43 is reversely energized (#111) for a predetermined time (#112), and further is short-circuited (#113), and brake is applied to the motor 43, which is thus stopped. The waveforms at the terminals of the comparator 39 and motor 43 in this process are shown in FIG. 9. A switching circuit 44 is provided so that the electric current of the iRED 21 during driving can be set such that in this stopped state of the motor, the light, which has caused a signal to be generated from the PSD 24 in the pulse side slit row 25a–25m of the prism 25, comes to substantially the center of the PSD 24 for the pulse side slit row.

Thereafter, the driving current of the iRED 21 is switched to a value for measurement by the switching circuit 44 and as previously described, the analog switches 31 and 32 are switched on (#114), and the outputs A and B of the pulse slit row side PSD 24 are passed through the current/voltage converting circuit 35 and the amplifying circuit 36 and input to the A/D converter 40 in the IC. Thereafter, the microcomputer 41 calculates A/(A+B) as previously described (#115), and detects on what location on the PSD 24 the slit light is impinging.

The microcomputer 41 likewise switches on the analog switches 33 and 34 (#116), detects on which portion of the linear slit row side PSD 23 the slit light is impinging (#117), finds the difference therebetween (#118), and turns off the iRED 21 (#119), whereafter the microcomputer 41 detects which of the intervals 0.2, 0.08, 0, −0.08 and −0.2 shown in FIG. 7 this value is (#120), and the zooming operation is terminated (#121).

Assuming, for example, that at first, the zoom lens is stopped at the WIDE end (absolute value −0.2), i.e., the position of the slit 25a, and the number of pulses counted until the zoom button is released is 8 (eight) corresponding to the slits 25a–25h and the zoom lens is stopped for the ninth pulse, the pulse ought to have detected the position of the slit 25i in the pulse slit row. The difference between the position of the slit light on the PSD 24 by the slit 25i and the position of the slit light on the PSD 23 by the slit 25I in the linear slit row is actually calculated. When the difference is −0.08, it means that the position of the zoom lens and the operation thereof were normal and therefore, shift is not made to the re-operation flow (#112) which will be described later. When the result of the calculation is e.g. +0.08, that is, when a result is put out which differs from the position which will be reached by the counted pulse number, it means that an abnormal operation was performed and therefore, a shift is made to the re-operation flow (#112) which will be described later.

Also, when a value which, like ±0, exists at only one location is read, priority is given to that rather than to the counted number of pulses and shift is not made to the re-operation flow.

Design is further made such that the aforedescribed battery replacing operation starts from the ON of the analog switches 31 and 32 as shown at #114 in FIG. 10, and in this case, the aforementioned counted number of pulses is "0" and therefore, shift is made to the re-operation flow without fail.

Figure 11:
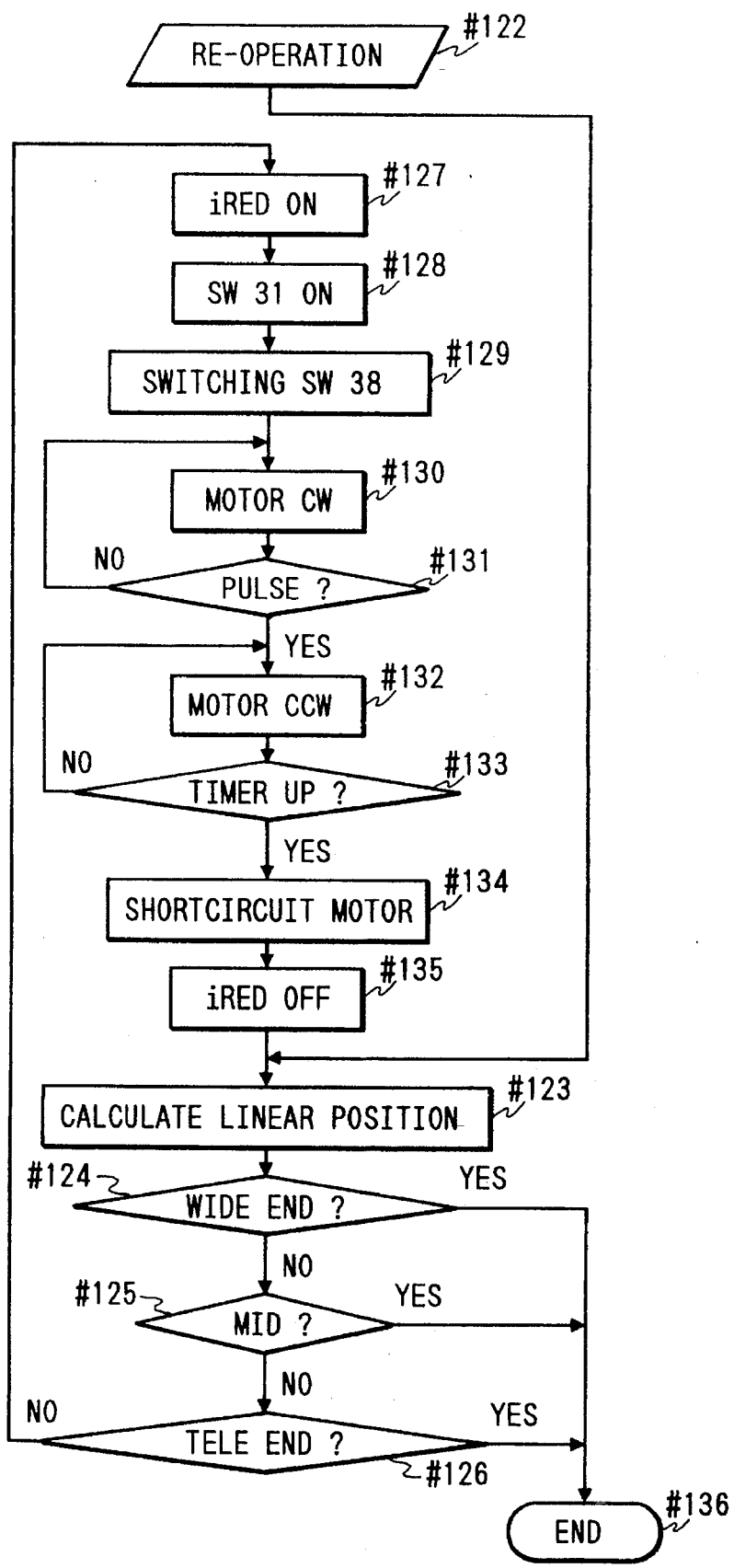
FIG. 11 is a flow chart showing the re-operation by the circuit shown in FIG. 5.

The re-operation flow shown in FIG. 11 will now be described.

When shift is made to the re-operation flow (#122), calculation of the measured position is first effected from the detected information of PSD's 24 and 23 (#123), and if the result thereof is the WIDE end (#124), the program comes to an end (#136), and if the result is not the WIDE end, whether the measured position is the central position is discriminated (#125). If the measured position is the central position, the operation is terminated to give priority to this position (#136). If the measured position is not the central position, whether the measured position is the TELE end is discriminated (#126), and if it is the TELE end, the operation is terminated (#136), and if not so, advance is made to #127.

The operation of #127–#129 carries out the same processes as the process of #102–#104 in the flow of FIG. 10, and renders the position detection by the PSD 24 possible.

When one pulse is detected by the zooming operation (#130 and #131), the motor is reversely energized (#132) and a brake is applied to the motor to stop it so that the slit light may come to the central position of the PSD 24 (#133 and #134). The iRED 21 is turned off (#135) and the aforedescribed process of #124–#126 is carried out, and while this flow is stopped for each one pulse until the WIDE end, the central position or the TELE end is reached, the value there is read. That is, the corresponding two slits in the pulse slit row and the linear slit row are such values that the intervals at the TELE end, the WIDE end and the central position each exist at only one location in the zoom area and therefore, by the difference therebetween being read, each of the focal length positions can be known. The re-operation basically is an operation where zooming is stopped for each one pulse, and the absolute value there is read. This is repeated, until the value becomes a value which exists at only one location in the zoom area. When the difference between the values of the pulse slit row side PSD 24 and the linear side row side PSD 23 is first read and in the case of the present embodiment, it is +0.08 or −0.08, movement is made to the zoom position next by one step and the same operation is repeated again.

If the absolute value is one of +0.2, 0 and −0.2, the motor is stopped there and that value is memorized.

FIG. 8 shows the images of lights passed through the respective slits of the prism 25, which are formed on the pulse slit row side PSD 24 and the linear slit row side PSD 23. Vertical solid lines indicate a state in which the motor has been stopped at a certain zoom position by ordinary control. If like this, the motor is stopped substantially near the center, a predetermined absolute value can be read.

Consider a case where the motor has been stopped, for example, at a position as indicated in broken lines by the same control when there are changes in the environmental conditions (such as temperature and humidity) of the camera or the condition of the power source or when an extraneous force is applied during the operation.

In such a case, by making the linear slit row side PSD 23 longer than the pulse slit row side PSD 24, a first effect, i.e., the prevention of an erroneous reading, can be achieved.

That is, where the linear slit row side PSD 23 is equal in length to the pulse slit row side PSD 24, the lights indicated by the broken lines in FIG. 8 protrude from the sensor and no right value can be read and in some cases, the absolute value may be mistaken, but erroneous reading of this kind can be prevented.

Since the waveform A, as shown in FIG. 9, is assumed during driving, the length of the pulse slit row side PSD 24 must avoid at any rate such a case that the two slits fall onto the pulse slit row side PSD 24 at a time. The linear slit row side PSD 23 can be made long to such a degree that strong light from the neighboring slit does not come in during stoppage, this is because PSD 23 is not used during driving.

A second effect is that the difference between absolute values (that is, according to the present embodiment, the difference between −0.08 and −0.2 is 0.12) can be made great. As this difference becomes greater, the absolute values are not wrongly read when the stop position becomes irregular or when there are various conditions including the difference in posture. When the difference between the absolute values is kept long, the linear slit row side will draw nearer and nearer to the end even if the pulse slit row is stopped at the central portion of the PSD.

If at this time, the linear slit row side PSD 23 is made long, even the slit at the end can be read at an accurate value.

As described above, according to the present embodiment, there can be obtained the following effect.

Not all of the corresponding slits in the first slit row and the second slit row are at intervals of different values. Some predetermined slits are at intervals of different values and the other intervals are made equal, whereby the differences in interval between the slits can be made great. Therefore, manufacture is easy and moreover, position detection can be accomplished very accurately, even if the manufacturing accuracy and driving accuracy of the object to be detected are alleviated.

Also, according to the present embodiment, a plurality of locations at which the only absolute values (i.e., the intervals 0.1, 0.2 and −0.2 shown in FIG. 7) can be obtained, i.e., a plurality of positions at which the absolute values (the absolute positions) can be immediately recognized, are provided. When a detection error by the replacement of the power supply battery occurs, the zoom lens is simply moved over a short distance, whereby the zoom lens can be moved to a position at which the absolute positions can be recognized. This leads to the obtainment of the effect that a shift can be made to the next zooming operation in a short time.

A second embodiment of the present invention will now be described, but since this embodiment is one in which as previously described, the PSD 23 forming the sensor is made longer than the PSD 24, only the differences of the second embodiment from the first embodiment will hereinafter be described.

Figure 12:
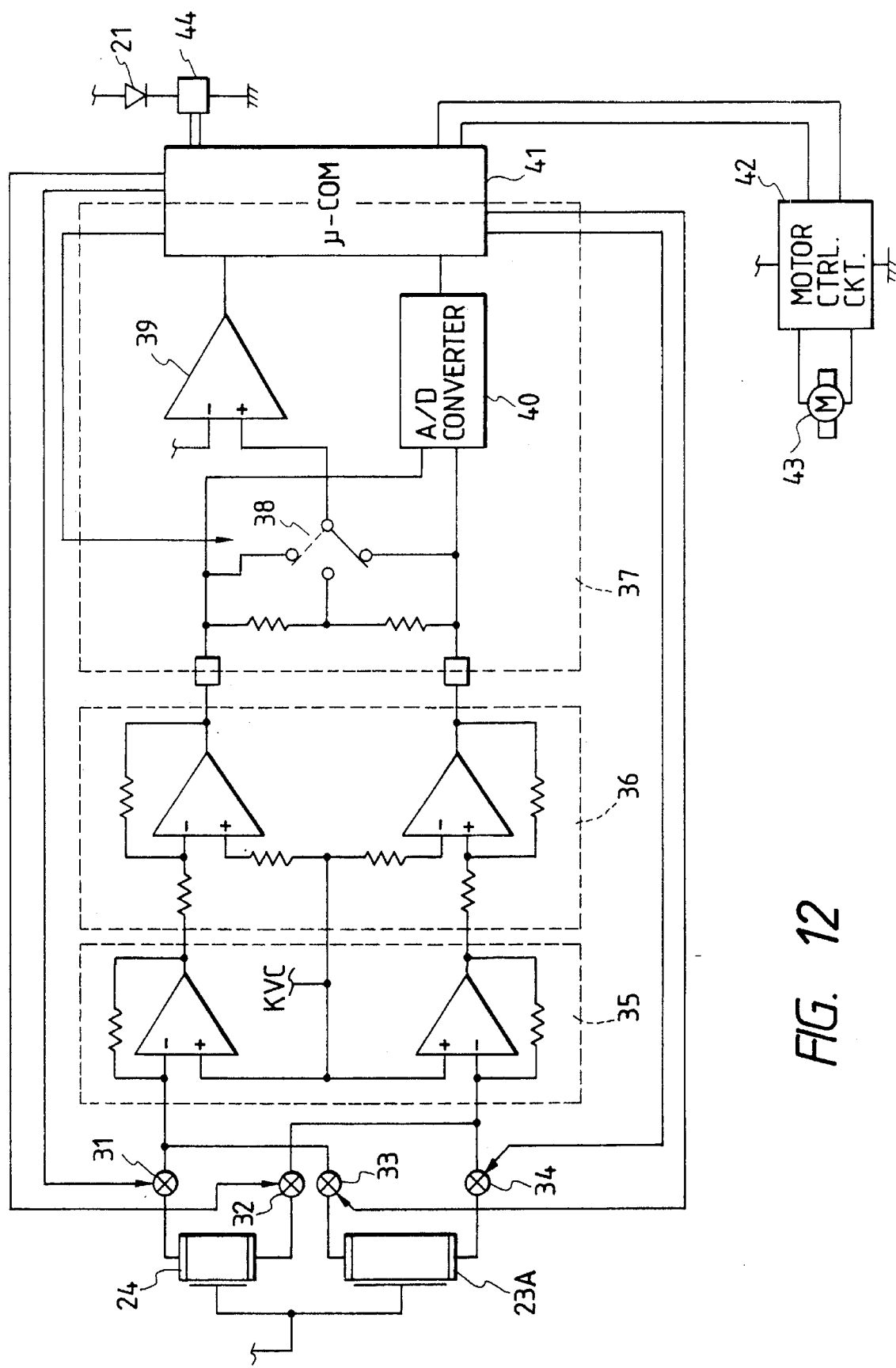
FIG. 12 is a circuit diagram of an encoder according to a second embodiment of the present invention.
Figure 13:
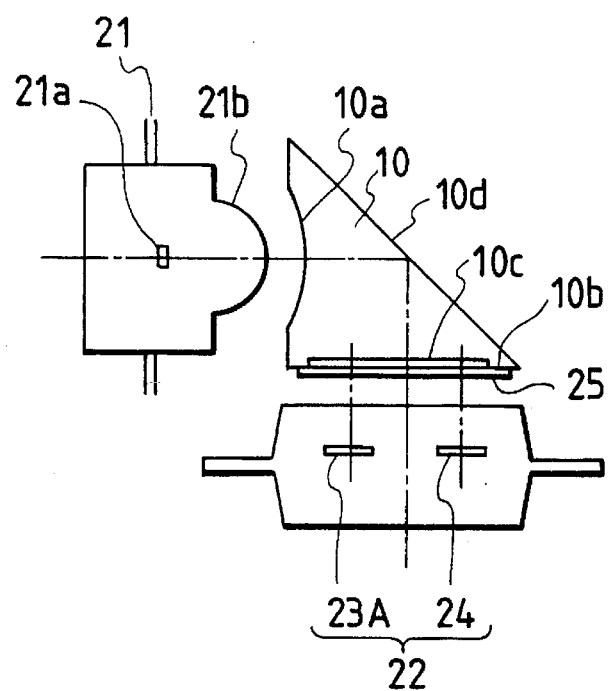
FIG. 13 is a cross-sectional view of the encoder shown in FIG. 12.
Figure 14:
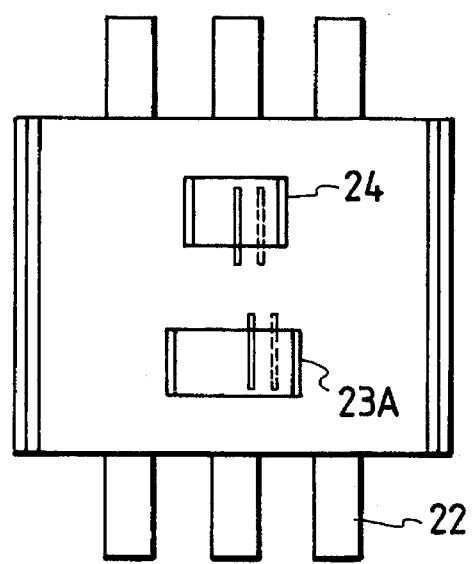
FIG. 14 is an enlarged view of the encoder shown in FIG. 13.

Also, those elements according to the second embodiment shown in FIGS. 12 to 14 which are the same as the elements in the first embodiment are given the same reference characters and need not be described.

In FIGS. 12 to 14, the length of the PSD 23 for detecting the linear slit row 25A–25M in the direction along the slit row (the direction of detection) is made greater than the length of the PSD 24 for detecting the pulse slit row 25a–25m in the direction along the slit row (the direction of detection).

Therefore, it becomes possible to make α and β, i.e., the intervals between corresponding slits, great. Even when a sensor of low accuracy is used, there can be obtained detection accuracy equal to that when a sensor of high accuracy is used.

As described above, according to the present invention, there can be obtained by the following effect.

Not all of the corresponding slits in the first slit row and the second slit row are at intervals of different values, but some predetermined slits are at intervals of different values and the other intervals are made equal, whereby the differences in interval between the slits can be made great. Therefore, manufacture is easy and moreover, position detection can be accomplished very accurately, even if the manufacturing accuracy and driving accuracy of the object to be detected are alleviated.

While the above-described embodiments are ones in which the sensor 22 is designed to be moved in operative association with the member to be detected, the sensor 22 may be fixed and the gauge member 10 may be moved in response to the member to be detected. Also, the above-described embodiments are optical ones, but use can also be made of a magnetism producing member and a magnetism detecting member, for example, a Hall element.

What is claimed is:

1. An apparatus comprising:

(a) a detection device which detects a movement state of an operation member; and (b) a determination device which determines the movement state of the operation member in accordance with at least first and second determinations, in said first determination said determination device determining an output of said detection device, and in said second determination said determination device more coarsely determining an output of said detection device than in said first determination by judging whether the output of said detection device is within a predetermined value-range.

2. An apparatus comprising:

(a) a detection device which detects a movement state of an operation member;

(b) a determination device which determines the movement state of the operation member in accordance with at least first and second determinations, in said first determination said determination device determining the movement state of the operation member during movement of the operation member in accordance with an output of said detection device, in said second determination said determination device more finely determining a stop position of the operation member after the operation member has stopped in accordance with the output of said detection device.

3. An apparatus according to any one of claims 1 or 2, wherein said apparatus comprises a camera.

4. An apparatus according to any one of claims 1 or 2, wherein said apparatus comprises a lens system.

5. An apparatus according to any one of claims 1 or 2, wherein said detection device includes means for detecting a movement position of said operation member.

6. An apparatus according to any one of claims 1 or 2, wherein said detection device comprises a non-contact detection device.

7. An apparatus according to any one of claims 1 or 2, wherein said detection device comprises an optical detection device.

8. An apparatus according to any one of claims 1 or 2, wherein said detection device comprises a PSD.

9. An apparatus according to any one of claims 1 or 2, wherein said detection means includes:

a) a first row of detection units disposed in a movement direction of said operation member, and b) a second row of detection units disposed in a movement direction of said operation member, said detection device detecting a movement position of said operation member using a combination of said first and second detection rows of detection units.

10. An apparatus according to any one of claims 1 or 2, wherein said detection device includes a sensor for outputting an analog signal indicating which outputs the movement state of said operation member.

11. An apparatus according to any one of claims 1 or 2, wherein said determination device includes means for binarizing an output of said detection device, and for using the binarized output for said first determination.

12. An apparatus according to any one of claims 1 or 2, wherein said detection device comprises means for detecting an actual movement state of the operation member.

13. An apparatus according to any one of claims 1 or 2, further comprising a motor for moving said operation member.

14. An apparatus according to any one of claims 1 or 2, wherein said detection device includes adjustment means for changing a movement stop position of said operation member.

15. An apparatus according to any one of claims 1 or 2, wherein said detection device includes adjustment means for changing an output characteristic of said detection means.

16. An apparatus according to any one of claims 1 or 2, wherein said detection device comprises:

a) a first sensor for outputting a movement signal of said operation member; and b) a second sensor for outputting a movement signal of said operation member, a detection range of said second sensor for a movement direction of said operation member being different from a detection range of said first sensor.

17. An apparatus, comprising:

a detection device which detects a movement state of an operation member;

a determination device which determines the movement state of the operation member in accordance with at least first and second determinations, in said first determination said determination device determining an output of said detection device, and in said second determination said determination device more coarsely determining an output of said detection device than in said first determination; and a movement device which moves said operation member in a predetermined direction when said determination device cannot determine the movement state of said operation member.

18. An apparatus, comprising:

a detection device which detects a movement state of an operation member;

a determination device which determines the movement state of the operation member in accordance with at least first and second determinations, in said first determination said determination device determining an output of said detection device, and in said second determination said determination device more coarsely determining an output of said detection device than in said first determination; and a movement device which moves said operation member to a predetermined position when said determination device cannot determine the movement state of said operation member.

19. An apparatus, comprising:

a detection device which detects a movement state of an operation member;

a determination device which determines the movement state of the operation member in accordance with at least first and second determinations, in said first determination said determination device determining an output of said detection device, and in said second determination said determination device more coarsely determining an output of said detection device than in said first determination; and a movement device which moves said operation member in a predetermined direction when said determination device determines that the movement state of said operation member is not appropriate.

20. An apparatus, comprising:

a detection device which detects a movement state of an operation member;

a determination device which determines the movement state of the operation member in accordance with at least first and second determinations, in said first determination said determination device determining an output of said detection device, and in said second determination said determination device more coarsely determining an output of said detection device than in said first determination; and a movement device which moves said operation member to a predetermined position when said determination device determines that the movement state of said operation member is not appropriate.

21. An apparatus comprising:

a detection device which detects a movement state of an operation member; and a determination device which determines the movement state of the operation member in accordance with at least first and second determinations, in the first determination said determination device determining an output of said detection device, and in said second determination said determination device more coarsely determining an output of said detection device than in said first determination by grouping outputs of said detection device.

* * * * *

UNITED STATES PATENT AND TRADEMARK OFFICE
CERTIFICATE OF CORRECTION

PATENT NO. : 5,623,142
DATED : April 22, 1997
INVENTOR(S) : Takayuki TSUBOI, et al.

It is certified that error appears in the above-identified patent and that said Letters Patent is hereby corrected as shown below:

ON THE COVER PAGE:

Under item [54] "Title":

Line 1, "ENCODING" should read --ENCODER--; and
Line 2, "POSITION" should read --POSITIONS--.

COLUMN 1,

Line 1, "ENCODING" should read --ENCODER--; and
Line 2, "POSITION" should read --POSITIONS--.

COLUMN 3,

Line 36, "stroke at" should read --stroke. At--; and
Line 40, "put aside" should read --put-aside-- and "and" should be deleted.

COLUMN 4:

Line 13, "25 secured" should read --25, which is secured--; and
Line 19, "row" should read --row,--.

UNITED STATES PATENT AND TRADEMARK OFFICE
CERTIFICATE OF CORRECTION

PATENT NO. : 5,623,142     Page 2 of 3
DATED : April 22, 1997
INVENTOR(S) : Takayuki TSUBOI, et al.

It is certified that error appears in the above-identified patent and that said Letters Patent is hereby corrected as shown below:

COLUMN 5:

Line 42, "41" should read --41,--.

COLUMN 6:

Line 25, "is" should be deleted; and
    Line 31, "row" should read --row,--.

COLUMN 10:

Line 5, "by" should be deleted;
    Line 51, "any one of" should be deleted;
    Line 53, "any one of" should be deleted;
    Line 55, "any one of" should be deleted;
    Line 58, "any one of" should be deleted;
    Line 61, "any one of" should be deleted;
    Line 64, "any one of" should be deleted; and
    Line 66, "any one of" should be deleted.

UNITED STATES PATENT AND TRADEMARK OFFICE
CERTIFICATE OF CORRECTION

PATENT NO. : 5,623,142
DATED : April 22, 1997
INVENTOR(S) : Takayuki TSUBOI, et al.

It is certified that error appears in the above-identified patent and that said Letters Patent is hereby corrected as shown below:

<u>COLUMN 11</u>:

Line 8, "any one of" should be deleted;
Line 12, "any one of" should be deleted;
Line 16, "any one of" should be deleted;
Line 19, "any one of" should be deleted;
Line 22, "any one of" should be deleted;
Line 26, "any one of" should be deleted; and
Line 29, "any one of" should be deleted.

Signed and Sealed this

Twenty-fifth Day of November, 1997

Attest:

BRUCE LEHMAN

Attesting Officer    Commissioner of Patents and Trademarks